Feb. 25, 1958  R. W. PAGE  2,824,370
DENTAL DRILL
Filed Sept. 13, 1955  3 Sheets-Sheet 1
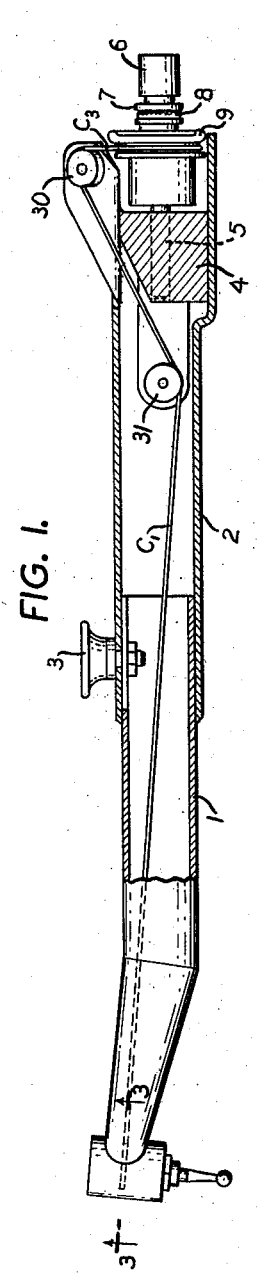
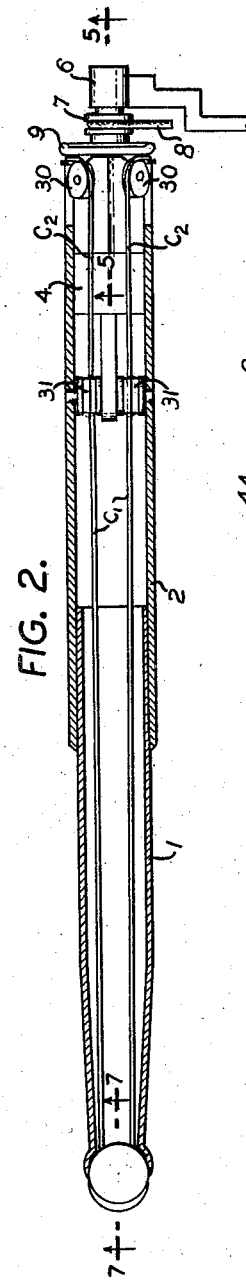
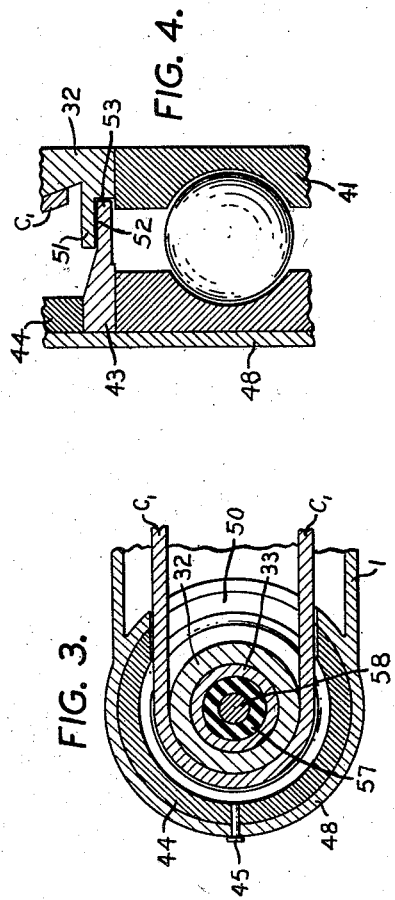
INVENTOR
RICHARD W. PAGE.
BY
ATTORNEY Feb. 25, 1958 — R. W. PAGE — 2,824,370
DENTAL DRILL
Filed Sept. 13, 1955 — 3 Sheets-Sheet 2
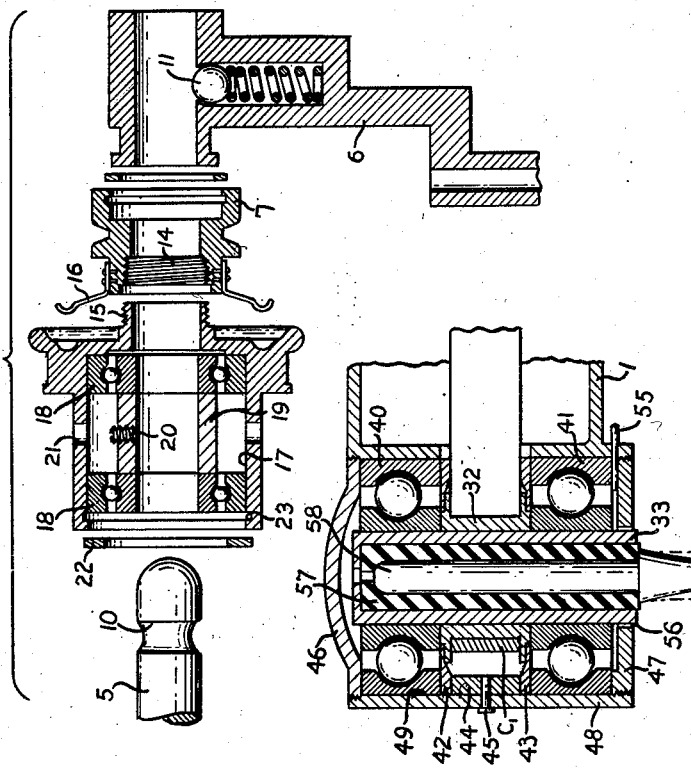
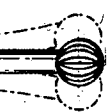
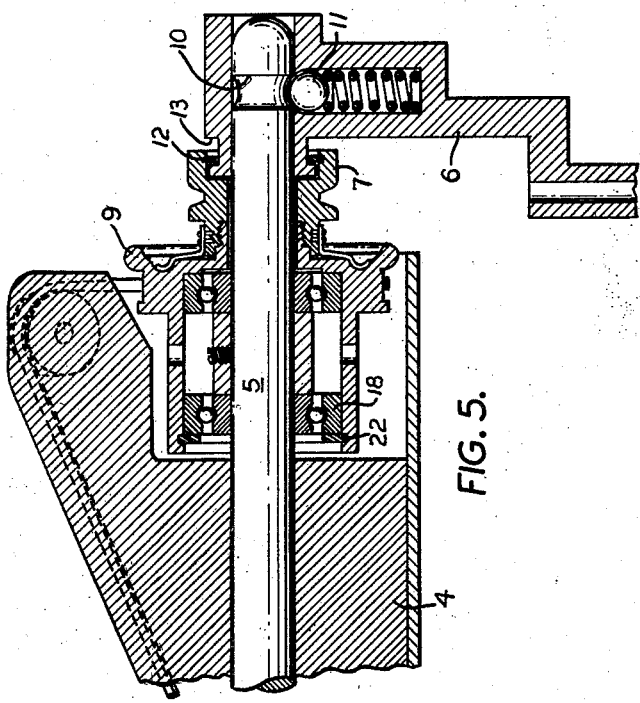
INVENTOR
RICHARD W. PAGE.
BY
ATTORNEY Feb. 25, 1958
R. W. PAGE
2,824,370
DENTAL DRILL
Filed Sept. 13, 1955
3 Sheets-Sheet 3
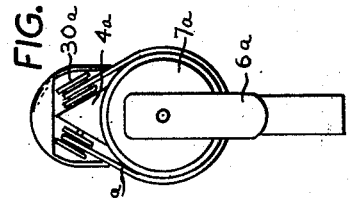
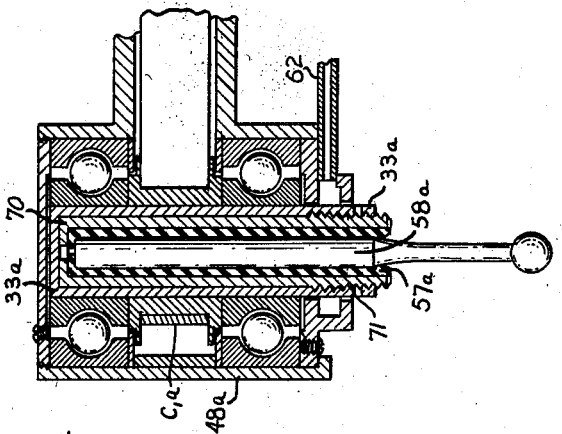
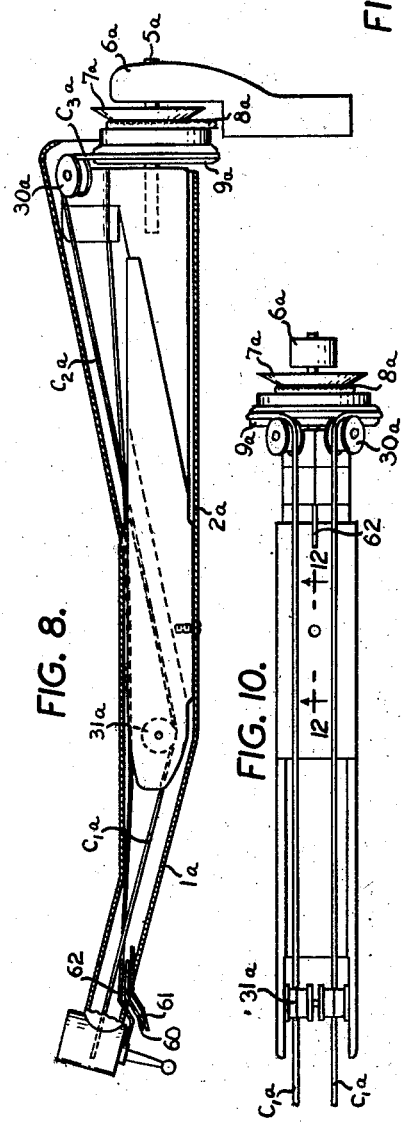
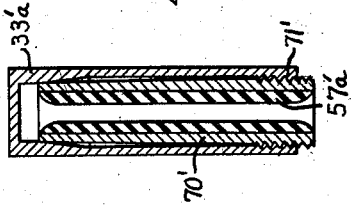
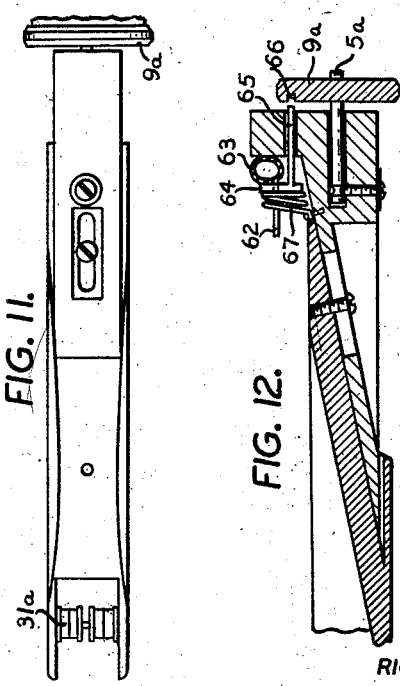
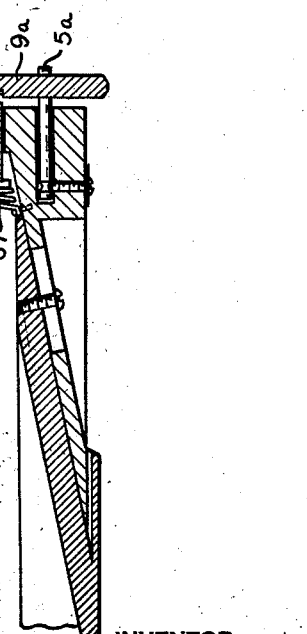
INVENTOR
RICHARD W. PAGE.
BY
ATTORNEY

United States Patent Office

2,824,370
Patented Feb. 25, 1958

2,824,370

DENTAL DRILL

Richard W. Page, Chappaqua, N. Y., assignor to Chayes Dental Instrument Corporation, New York, N. Y., a corporation of New York Application September 13, 1955, Serial No. 534,037

4 Claims. (Cl. 32—27)

This invention relates to dental drills and, more particularly, to high speed dental drilling equipment.

Conventional dental drilling equipment as heretofore used utilizes a comparatively slowly rotating drill (about 16,000 R. P. M. being fairly typical), the drive to the hand piece being generally a belt and pulley drive and the internal drive connection to the drill proper being a gear connection. The speed possibilities of a drive of this character are quite limited. With the advent of carbide and diamond drills and with the development of air and water systems for use with such drills, the desirability of a really high speed dental drill has been apparent for some years.

The general object of the present invention is to provide an improved dental drilling instrument capable of operation at extremely high speeds.

A second object of the invention is to provide an improved drilling head arrangement which is capable of furnishing maximum protection to rotative bearing elements against the entry of water, drilling detritus, and other possible injurious substances.

A further object is to provide a dental drilling instrument capable of operating with a minimum of sensitivity of vibration on the part of the patient.

Still another object of the invention is to provide a dental drilling instrument operable with a minimum of pressure of the cutting tool against a tooth, resulting in a marked decrease of discomfort to the patient.

A dental drill embodying the invention in a preferred form will now be described with reference to the accompanying drawing, and the features forming the invention will then be pointed out in the appended claims.

In the drawing:

Fig. 1 is a side elevational view of a dental instrument, partly broken away to show internal structure;

Fig. 2 is a plan view, with part of the casing also broken away to show internal structure;

Fig. 3 is an enlarged section on line 3—3 of Fig. 1;

Fig. 4 is an enlarged detail of a part of Fig. 7, showing a seal adjacent the drill bearing;

Fig. 5 is an enlarged section on line 5—5 of Fig. 2;

Fig. 6 is an exploded view, showing the parts of Fig. 5 separated from each other;

Fig. 7 is an enlarged section on the line 7—7 of Fig. 2;

Fig. 8 is a side elevational view, with parts broken away, of a modified form of drilling instrument;

Fig. 9 is an end elevation of the instrument of Fig. 8;

Figs. 10 and 11 are, respectively, a top plan view and a bottom plan view of a part of Fig. 8;

Fig. 12 is a section on the line 12—12 of Fig. 10;

Fig. 13 is a section similar to Fig. 7, but showing a modified drill end assembly; and Fig. 14 is a detail view showing the construction of part of Fig. 13.

The instrument of Figs. 1–7 is a contra-angle adapted for use with conventional belt and pulley engine arms. It comprises a casing including telescoped elements 1 and 2, adjustably held together by a screw 3. Block 4 fixed in the casing element 2 carries a shaft 5, the tip of which is held in a supporting member 6 attached to the engine arm. Rotatably mounted on the shaft 5 is an assembly including a pulley 7 driven by belt 8 on the engine arm and pulley 9 rotatable therewith and which drives the drill as hereinafter described in detail.

The details of the engine arm end of the contra-angle is shown more fully in Figs. 5 and 6. As there shown, shaft 5 has a groove 10 adjacent its tip which cooperates with a spring pressed detent ball 11 for releasably holding the shaft 5 in the engine arm element 6. The engine arm driven pulley 7 is coupled to the element 6 by means of a snap ring 12 received in a groove 13 in the element 6, and has an internally threaded hub 14 which screws onto externally threaded hub portion 15 of the pulley 9. Spring fingers 16 engaging a web of the pulley 9 further serve to couple the parts together. The hub of pulley 9 is also formed with a bore 17 within which are located anti-friction ball bearings 18, separated by a collar 19 which may be fixed in position on the shaft 5 by means of a set screw 20, access to which is furnished through holes 21 in the hub. A retainer ring 22 fitting in a groove 23 serves to hold the bearings 18 and collar 19 in axial position within the hub of pulley 9. The pulley 9 preferably has a larger diameter than pulley 7, a ratio of about 2–1, as shown, being satisfactory and providing a step up in belt speed.

The drive within the contra-angle itself is a belt drive and comprises idle pulleys 30 and 31 and a driven pulley 32, arranged as shown. The driven pulley 32 is concentric with the drill carrying socket or element 33, and the idle pulleys 31 are arranged to maintain the belt courses between pulleys 31 and pulley 32 at right angles to the axis of the drill socket 33, so as to maintain the belt courses C–1 (Fig. 1). The spacing of pulleys 31 from each other (Fig. 2) may be such as to guide the belt courses C–1 in substantial parallelism, providing 180° of wrap of the belt on the driven pulley 32. Pulleys 30 are located so as to maintain the belt courses C–2 between them and pulleys 31 in parallelism, and to maintain the courses C–3 between pulleys 30 and the drive pulley 9 in a plane at right angles to shaft 5 and with the courses C–3 and C–2 defining planes at right angles to the axes of rotation of the pulleys 30. It will be observed that the pulleys 30 are toed in so as to give an angle of wrap of the belt on pulley 9 which is materially in excess of 180°. The diameter of pulley 9 is also relatively large by comparison with that of pulley 32, so as to obtain a step up in rotative speed. The ratio may be 5 or 6 to 1. For example, driven pulley 32 has in one actual instrument, a diameter of .165 inch, while the drive pulley 9 has a diameter of .960 inch. The belt need not be massive and a belt .100 inch in width and .024 in thickness has been found satisfactory, the over-all length being about 18 inches.

Any of a variety of plastic or rubber materials or combinations of such materials with textile fibers may be used, and coefficient of friction of belt and metal having a normal value of about .25 has been found satisfactory.

At the drill end of the instrument, the drill socket 33 is supported in a pair of ball bearings 40 and 41, with the pulley 32 positioned between the inner races, as shown in Fig. 7. Between the outer races is a pair of sealing washers 42, 43 and a spacer ring 44 which may be held in place by a pin 45. End cap elements 46, 47 serve to hold the parts in position axially of the drill socket 33. The bearing housing 48 is formed integral with, or fixed to the casing section 1, as indicated, and has an accurate cylindrical inner surface or bore 49 within which the bearings and elements 42—44 fit, as shown.

The elements 42 are of annular form and extend completely around the pulley and bearings, while the element 44 is cut out, at 50, to accommodate the belt courses C-1, as shown in Fig. 3. Fig. 4 shows the sealing cooperation between pulley 32 and ring 43 (this is the same as between the pulley and ring 42). As there shown, the pulley flange 51 is recessed on its outer face 52 and the inner part 53 of ring 43 fits this recess, having a slight operating clearance from the pulley flange 51 and also from the adjacent inner race of the ball bearing 41. An air connection 55 (Fig. 7) is provided and air is continuously supplied through this element so as to maintain the inner part of the casing 49 under slight pressure and also to exhaust air at point 56 between the drill socket 33 and element 47, so as to insure that dirt, tooth particles and the like will not get into the bearings. The drill chuck comprises a rubber sleeve 57 into which the shank 58 of the drill is frictionally fitted.

The drive of pulley 7 and belt 8 may be conventional and presents no special problems, speeds from 15,000–30,000 R. P. M. at this point being readily obtainable and producing idle rotation speeds of the drill from 60,000 to 100,000 R. P. M. or even higher.

The belt tension may be readily adjusted by varying the degree of telescoping of casing sections 1 and 2 and then fastening in the adjusted position by means of the screw 3. A tension somewhat less than 8 ounces and typically about 3 or 4 ounces (total static tension) is found suitable. When running, the belt appears to run taut on one side and slack on the other, so that tension in the driven or taut side of the belt is presumably about 3 or 4 ounces.

The desired belt tension may be readily provided by holding the instrument with the end uppermost and drill lowermost, and hanging a fixed weight from the drill, the lock screw 3 being backed off or loosened. Under these conditions, the weight is suspended by the tensions on the belt and the belt tension may be fixed by tightening the screw 3 and then removing the weight.

The drive of the present invention is of a surprisingly efficient character in view of the speeds involved and in view of the size limits of certain of the parts. For example, with the drive pulley 9 running at about 14,000 R. P. M. idling speed, the belt speed is around 300 feet per minute, while the angle of bend around the driven pulley is quite sharp, it is found that the wear on the belt is negligible, and to a point where the belt may be expected to outlast the bearings. The service life of the bearings themselves has been found to be comparable to conventional slow speed gear driven units.

Stroboscopic speed measurements have indicated percentage of slip on the belt and the driven pulley 32, when idling, of about 10%, the driven pulley running at about 72,000 R. P. M. as compared to something over 80,000 R. P. M. theoretical no slip speed of rotation. Under drilling conditions, the slip occurs, the slip percentage rising to, perhaps, 25%, and sufficient torque being exerted in some cases so as to cause a slowing down of the pulley 9.

The instrument has been operated to advantage with drive pulley speeds from 14,000 to 30,000 R. P. M., corresponding to indicated drill rotative speeds from 81,000 to 160,000 R. P. M. and over, and the actual drill rotative speeds considering slippage from 50,000 to 100,000 R. P. M. and over.

The instrument appears to be capable of delivering the major portion of the rated horse power of the engine arm motor at the drill tip, as the coefficient of friction between belt and pulley multiplied by the linear speed of travel of the belt under idling conditions exceeds the rated horse power of the ordinary dental engine motor used as a driving element. In consequence, a drop in drill rotative speed under load and a substantial percentage of idle speed will increase the slip to such an extent as to cause a relatively high torque and power consumption.

It is found that the instrument of the invention operates most satisfactorily with carboloy or similar cutters formed with definite cutting edges, as opposed to abrasive tools, and the action obtained appears to be a true chiseling cutting or flaking action, as opposed to a grinding action. Using a burr having six cutting edges, the theoretical number of cuts may be 5 or 10 thousand per second, which is divided into the quantity of enamel removed per second in cavity preparation, the result in production of particles of an average size corresponding to an impalpable dust or colloidal material. It is found, however, that the chip size is not small and the surface on which the drill has been operating presents the characteristic appearance of a machine milled surface, indicating the cutting and flaking action, as opposed to abrasive action. The time involved in cavity preparation is very materially reduced and the discomfort to the patient is also substantially reduced. Vibration does not appear to be a problem, and, in fact, some patients where novocaine was used have professed inability to tell whether the tooth was being drilled or not.

Figs. 8–13 illustrate a somewhat modified form of instrument. In this instrument corresponding parts are identified by numerals similar to those used in previous figures, but with the addition of the letter "a," the applicable description does not require repetition and will not be repeated. In this modified instrument, there are shown air and water supply nozzles 60 and 61, as well as an air supply line 62 for the drill bearing housing. In order to prevent operation of the instrument when no air is being supplied through line 62, line 62 has a branch (Fig. 12) leading to a bladder or bellows 63, which engages the head 64 of a lock pin 65, arranged to enter the recess 66 in the drive pulley 9a. A spring 67 normally urges the pin 65 into the recess 66, preventing rotation of the drill. If, however, air under the desired pressure is being supplied through the line 62, the resulting expansion of element 63 will hold the pin back in the position of Fig. 12 and out of the recess 66, including element 9a, thus permitting operation of the device. This insures that the instrument will not be operated without air pressure in the drill bearing housing 48a and thus protects the drill against use under conditions where water and detritus might enter the bearings due to oversight on the part of the dentist in failing to turn on the air. In this modification, the drill shank 58a is received in a rubber or other resilient sleeve 57a, as before, but this sleeve is bonded to the inside of the tubular shell or socket 70, which, in turn, fits in the socket 33a and is secured therein by threaded sections on the two elements engaging at 71, as shown.

The resilient mounting of the drill shank in the device of the present invention permits a slight lateral movement of the drill tip or burr, so that any slight initial misalignment of the drill is accentuated or increased by the centrifugal force when operating at the extremely high speeds at which the instrument is used. In consequence, the drill tip, when idling, rotates eccentrically, the axis moving in a cone, the diameter of which at the burr is a substantial fraction of the entire width of the burr and may, in extreme cases, equal the width of the burr tip itself. The drill is used with extremely light pressure, requiring a somewhat different technique from regular drilling equipment, but a technique which is readily acquired, the drilling pressure being of the order of a quarter of an ounce or so, or about 10 grams, which pressure is far below anything previously used. Whereas with conventional drilling equipment an increase in drilling pressure tends to produce a proportional or even greater increase in rate of removal of material at a given operating speed, the instrument of the present invention appears to have a cutting speed at given rotary speed, which is substantially determined and does not vary with a variation in applied pressure, the effect of an attempt to increase pressure being to diminish the rate of removal of material rather than to increase it.

The eccentric drill appears to operate by making approximately one cut for each revolution, so that a drill operating at 120,000 R. P. M. makes about 2,000 cuts per second, and a drill operating at 60,000 R. P. M. makes about 1,000 cuts per second, as opposed to 12,000-6,000 cuts per second, which would be the case if each successive tooth or cutting edge in a six toothed burr were effective. It will be noted that due to the extremely high rotary speed of the drill, even these frequencies of 1,000 or 2,000 cuts per second are well above the vibration frequencies which cause maximum unpleasantness to practically all patients, which frequencies tend to be around 200 cycles per second and would seldom exceed 600 cycles per second (Hudson et al., Journal of the American Dental Association, volume 50, page 378), and also above the upper threshold of perception to vibration for almost all patients (ibid). It has thus been found possible to operate with an eccentrically rotating drill without objectionable vibration and with a very marked improvement in cutting action.

The device is operated using water spray and preferably, air and water mist spray as a coolant and no difficulty due to heating of the tooth while drilling is experienced. While used in the manner stated in the drilling of enamel or hard material, the drill may also be operated at reduced speeds of a few thousand R. P. M. for the drilling of carious or other soft material. In this case, the centrifugal effect in causing eccentric rotation of the drill becomes negligible, the operation is essentially conventional and the successive cutting edges of the tip are operated in order as in the usual drill.

While it has never previously been thought or found possible to operate an angle dental drilling instrument by means of a pulley drive, no difficulty is exeperienced in the device of the present invention, since the operation involves essentially two distnict and entirely different drilling conditions, the instrument performing satisfactorily under these two different conditions but for entirely different reasons. In the drilling of soft material, the power required is low and it is possible to operate at slow speeds as just mentioned, even though the torque transmitting capacity of the drive is very small. In the drilling of hard material at high speeds, however, the torque required to transmit the necessary power becomes again very small, so that it is possible to deliver the required power even though using a driven pulley of such small size as is necessary to fit within an operating head of conventional and practical size.

The deivce has little or no tendency to stall when operated properly. Essentially, the drive is, as mentioned above, a slipping drive, in which the torque is proportional to the slipping speed or difference in linear rate of travel between the belt and the driven pulley on which the drill chuck is carried. Assuming an approximately constant coefficient of friction, and constant speed of rotation in the driving pulley and the engine arm of the instrument, it will be observed that an increase in percentage of slip from about 10% to about 25% as between idling and working conditions, involves 250% increase in torque, while a reduction in speed involved under these conditions is only about 20% or less. The result, of course, under the assumed conditions, is an increase of power transmitted from belt to the driven pulley of about 200%. A division of power as between friction losses in the bearings and the power consumed in drilling being in some such ratio as 1–3. It will be apparent that by the use of a very simple driving mechanism involving a pulley driven by a belt operating at a very reasonable linear rate of travel, a drive having the desirable characteristics of a fluid drive and none of the defects of a gear or similar drive has been provided and, moreover, a drive capable within the space requirements of a dental drilling instrument of providing speeds far in excess of anything heretofore obtained.

What is claimed is:

1. A dental drilling angle instrument comprising an elongated rigid frame structure, a chuck for holding a drill, bearings rotatably supporting the chuck in the frame structure at an angle to the longitudinal axis of the frame structure, a pulley carried by the chuck for driving the chuck, a pulley drive for said pulley, including a larger diameter drive pulley carried by the said frame structure, means for driving the drive pulley from a dental engine arm, the said drive pulley being mounted for rotation about an axis substantially parallel to the longitudinal axis of the elongated frame structure, and idle guide pulleys carried by the said frame structure and arranged with relation to the driving pulley and driven pulley for guiding the belt generally parallel to the longitudinal axis of the frame structure.

2. A dental drilling angle instrument according to claim 1, in which the said bearings are of greater diameter than the driven pulley pitch diameter, the driven pulley has an overall diameter of only about one-quarter inch and comprising a casing enclosing the bearings and driven pulley, which casing has an over-all diameter of approximately three-eighths inch.

3. A dental drilling angle instrument comprising a chuck for holding a drill, bearings rotatably supporting the chuck, a pulley for driving the chuck, a pulley drive for said pulley, including a larger diameter drive pulley, means for driving the drive pulley from a dental engine arm, the said drive pulley being mounted for rotation about an axis substantially parallel to the axis of the instrument, and idle guide pulleys carried by the instrument comprising a pair of guide pulleys adjacent the drive pulley, and toed in with respect to each other to give something more than 180° of wrap of the belt on the said drive pulley.

4. A dental drilling instrument according to claim 3, having also further idle guide pulleys intermediate the first two said guide pulleys and the driven pulley, the said idle pulleys being positioned with relation to each other and to the driving pulley for maintaining the belt courses as they approach and leave a guide pulley adjacent the driving or driven pulley in planes tangent to the pitch lines of the driving pulley and driven pulleys respectively.

References Cited in the file of this patent

UNITED STATES PATENTS

| 2,078,859 | Lapham | Apr. 27, 1937 |
| 2,442,033 | Brantly et al. | May 25, 1948 |
| 2,611,960 | Herndon | Sept. 30, 1952 |

FOREIGN PATENTS

| 437,446 | France | Feb. 17, 1912 |
| 515,349 | Great Britain | Dec. 4, 1937 |